June 4, 1940.  A. L. RANKIN  2,202,867
TRAILER HITCH
Filed Dec. 15, 1938   2 Sheets-Sheet 1
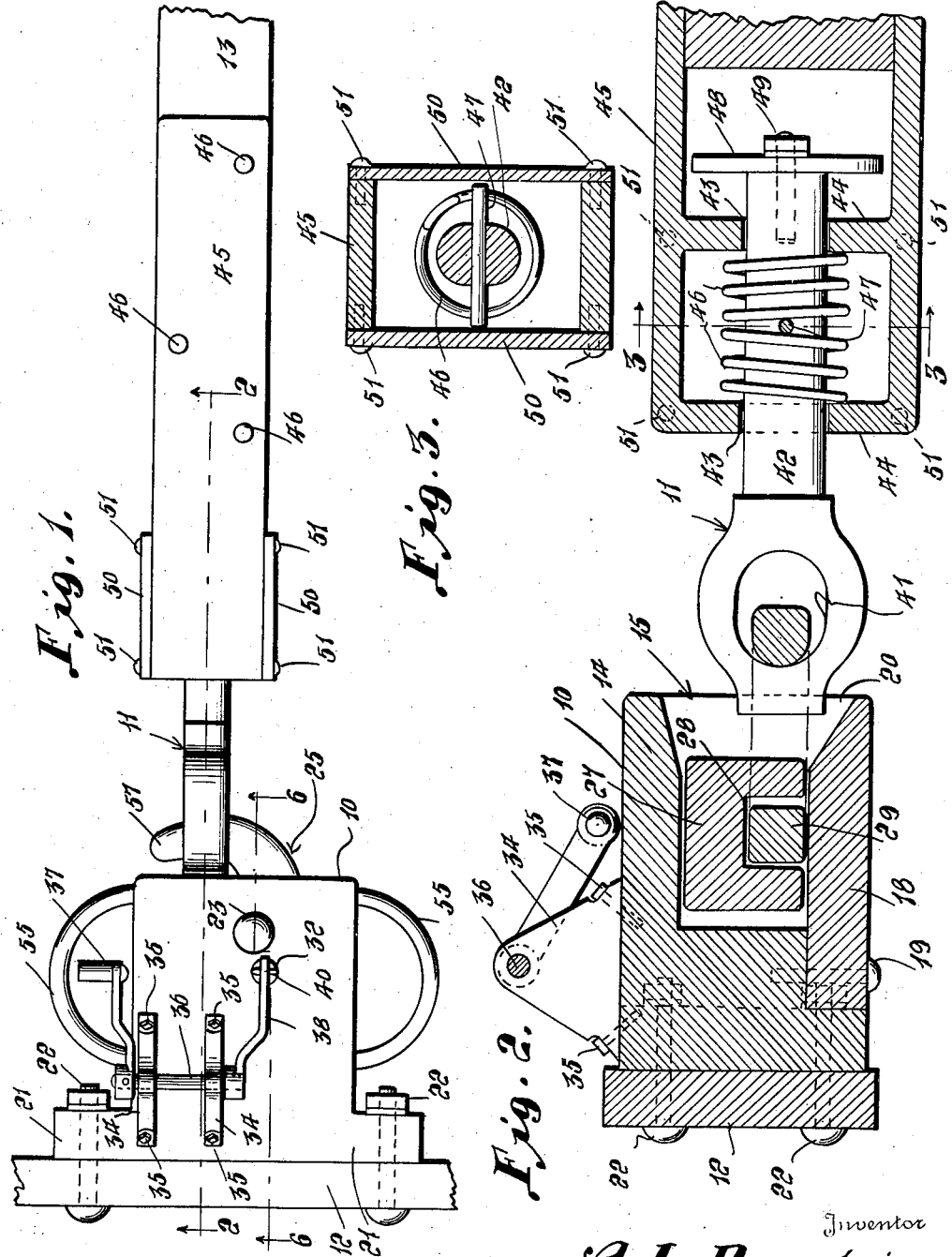
Inventor
A. L. Rankin
By L. F. Laudreth
Attorney June 4, 1940. A. L. RANKIN 2,202,867
TRAILER HITCH
Filed Dec. 15, 1938 2 Sheets-Sheet 2

Inventor
A. L. Rankin
By L. F. Randolph
Attorney

Patented June 4, 1940

2,202,867

UNITED STATES PATENT OFFICE 2,202,867

TRAILER HITCH

Albert L. Rankin, Stevenson, Wash., assignor of one-half to Margaret R. Calendine, Cascade Locks, Oreg.

Application December 15, 1938, Serial No. 245,978

4 Claims. (Cl. 280—33.15)

This invention relates to an improved coupler for connecting draft and trailer vehicles of various types.

It is an object of this invention to provide a coupler having means to rigidly or pivotally connect the coupler head to a draft vehicle, and means for resiliently connecting a coupler link to a trailer vehicle to provide a spring connection between the trailer and draft vehicle.

More particularly, it is an object of this invention to provide an improved trailer coupling including a head having a hook mounted therein adapted to be projected to an operative position by engagement of a link with said head to connect the hook and link, and latch means projected by the movement of said hook to retain the hook and link in engagement until said latch means are manually retracted.

Still a further object of the invention, is to provide an improved form of locking means for retaining the hook and link in engagement, having operating means for raising or retracting the latch for permitting the hook to be moved to its released position, said latch member being projected by gravity when released by the hook moving to an operative position to retain the hook in an operative position until the latch member is again manually retracted.

Figure 4:
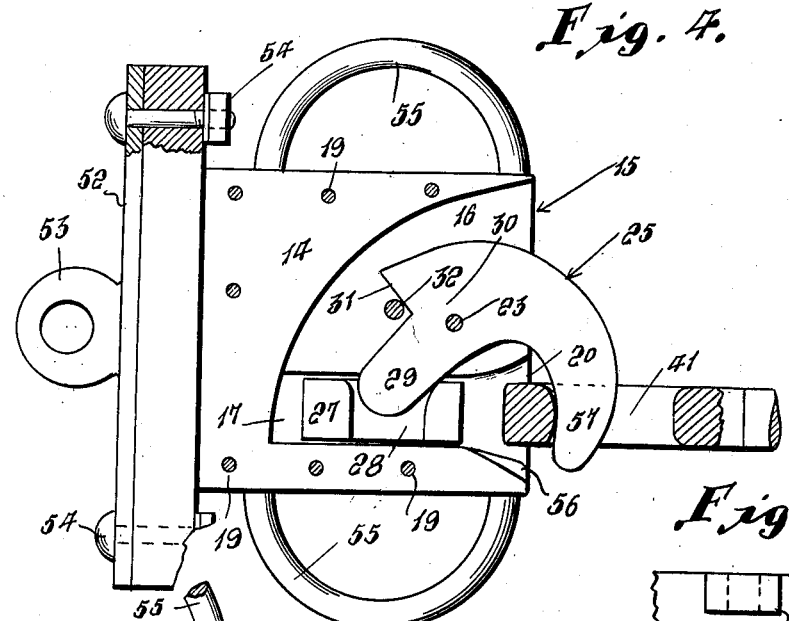
Figure 8:
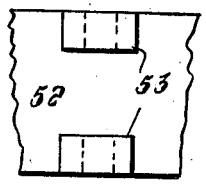
Figure 5:
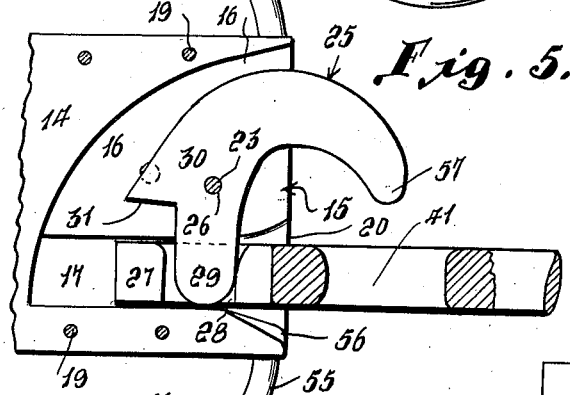
Figure 7:
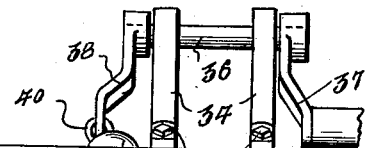
Figure 6:
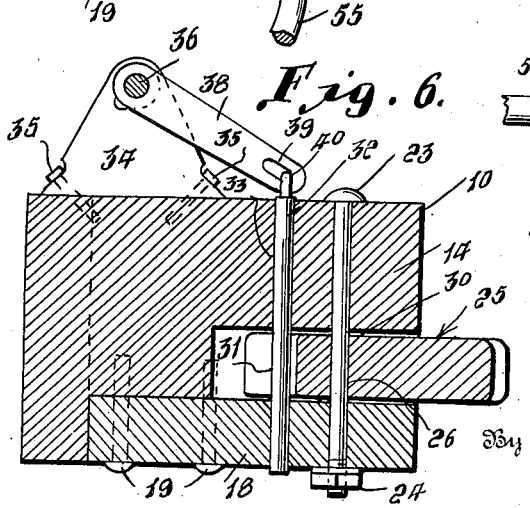

Other objects and advantages of the invention will hereinafter become more fully apparent from the following description of the drawings, which illustrate a preferred embodiment of the invention, and wherein:

Figure 1 is a top plan view showing the coupler connected,

Figure 2 is a longitudinal vertical sectional view taken on the line 2—2 of Figure 1, Figure 3 is a transverse vertical sectional view taken on the line 3—3 of Figure 2, Figure 4 is a bottom plan view of the coupler head showing the recessed block with the bottom plate of the head removed, and with the hook in an operative position engaging the link, Figure 5 is a view similar to Figure 4 showing the hook in an inoperative or released position, Figure 6 is a longitudinal vertical sectional view taken on the line 6—6 of Figure 1, Figure 7 is a front elevational view of the coupler head showing the hook in an operative position, and Figure 8 is a fragmentary side elevational view on a reduced scale of the attachment used in pivotally connecting the coupler head to a draft vehicle.

Referring more particularly to the drawings, wherein like reference characters designate like or corresponding parts throughout the different views, 10 designates generally the coupler head and 11 the coupler link which are adapted to be secured to a beam 12 of a draft vehicle and to a draw bar or tongue 13 of a trailer vehicle respectively.

The coupler head 10 includes the block 14 provided with a recess designated generally 15, which opens outwardly of the forward end of said block, 10 and which includes the arcuately shaped horizontally disposed portion 16 and the vertically disposed outwardly diverging portion 17, portions 16 and 17 communicating with each other adjacent the bottom of the portion 17. A bottom plate 18 is removably secured by means of the fastening 19 to the bottom of the block 14 to form a bottom for the recess 15. Plate 18 is provided with an arcuately shaped outwardly diverging tapered recess 20, which communicates with the recess 17 and forms a part thereof when the plate 18 is in position. Secured to the back of the block 14 and the plate 18 is a plate 21 which extends beyond the opposite sides of the block 14 and plate 18 to receive the removable fastenings 22 to removably and rigidly secure the head 10 to the beam 12.

Extending downwardly through the block 14 and through the recess 16 and bottom plate 18 is a bolt 23 which is secured to the head 10 by means of the nut 24. A hook, designated generally 25, is mounted in the recess 16 and is provided with an opening 26 in its shank through which the bolt 23 extends, as best seen in Figure 5, to pivotally mount the hook. A slide 27 is reciprocally mounted in the recess 17 and is provided with a recess 28 in its bottom into which extends the reduced end of the shank 29 to connect the slide 27 and hook 25. The reduced end 29 of the shank forms with the intermediate portion 30 thereof, the shoulder 31 for a purpose which will hereinafter be described.

Vertically disposed in the head 10 and positioned substantially parallel to the bolt 23, is the pin or latch member 32 which is reciprocally mounted in the bore 33 and which extends through the head 10 including the recess 16. Mounted on top of the head 10 in spaced relationship to each other, are the bearing members 34 which are secured to the block 14 by means of the fastenings 35 and in which is journaled the shaft 36 having a crank handle 37 keyed to one end thereof, and a lever 38 keyed to the opposite end. Lever 38, as best seen in Figure 6, is provided with a slot 39 adjacent its free end adapted to engage the eyelet 40 on the upper end of the pin 32 to cause said pin to be raised by an upward movement of the crank 37 to a retracted position with its lower end disposed above the upper side of the hook 25.

Link 11, as best seen in Figures 2 and 3, is provided with an eyelet 41 and a shank 42 projecting from said eyelet, and adapted to be slidably mounted in the openings 43 of the walls 44 of the housing 45. Housing 45 is adapted to be secured by means of the fastenings 46 to the draw bar or tongue 13 of the trailer vehicle, not shown, and to provide a spring cushioning connection between the trailer and draft vehicles. The expansion coil springs 46 are mounted on the intermediate portion of the shank 42 with their opposite ends engaging against the adjacent sides of the spaced walls 44, and with their adjacent ends engaging a pin 47 which extends transversely through the shank 42 so that the springs 46 will alternately resist an inward or outward movement of the link 11 relatively to the housing 45. Eyelet 41 forms a stop to limit the inward movement of the link 11, and a disk 48 removably secured to the inner end of the shank 42 by the fastening 49 is positioned in spaced relationship to the inner wall 44, to limit the outward movement of the link 11. Housing 45 may be provided with the side walls 50 removably mounted by the fastenings 51, as best seen in Figure 3, for exposing the interior of the forward end thereof, in which the springs 46 and pin 47 are mounted, for repair or adjustment of these parts.

An attachment is provided, comprising a plate 52 having the spaced apertured lugs 53 disposed in vertical alignment relatively to each other and adapted to receive a pin, not shown, to pivotally connect plate 52 to a draft vehicle such as a tractor. Plate 52 is adapted to be removably secured by means of the fastenings 54 to the back plate 21 when it is desirable to pivotally mount the head 10 on the draft vehicle instead of rigidly mounting it as indicated in Figures 1 and 2. Head 10 may be provided with the outwardly extending loop members 55 adapted to be loosely connected by any suitable means not shown, to either the draft or trailer vehicle or both, to maintain a connection between the draft and trailer vehicles in case the head 10 and link 11 should be accidentally disconnected or in the event that either the head 10 or link 11 should become disconnected from its draft or trailer respectively.

From the foregoing it will be seen, that the crank 37 may be raised to retract the latch member or pin 32 so that the hook 25 may be moved to its inoperative or released position, as seen in Figure 5, and in this position the lower end of the pin 32 will rest on the top of portion 30 of the hook 25 and will thus be held retracted. When the hook 25 is in the position as seen in Figure 5, slide 27 will be held in a projected position by engagement with the end 29 to be engaged by the forward end of the eyelet 41 which will be guided into engagement with the head 10 by the outwardly converging portion 56 of the recess 17. Eyelet 41 in moving into the recess 17 will strike the slide 27 to force it inwardly to its retracted position, thus swinging the hook 25 on its pivot 23 into its operative or engaging position so that the bill 57 of the hook 25 will engage and connect with the eyelet 41, as seen in Figure 4. This will cause the shank portion 30 of the hook 25 to be moved out of engagement with the pin 32 permitting it to be projected by gravity through the space between the shoulder 31 and the end 29, to engage against shoulder 31 thus preventing hook 25 from being retracted to release the link 11. The sections 10 and 11 of the coupler will thus be held in a connected position relatively to each other until the latch member 32 is manually retracted by raising crank 37 to release the hook 25 to permit it to be swung to its inoperative position by an outward pull on the link 11.

Various modifications and changes in the construction and arrangement of the parts forming the invention may obviously be made and are contemplated, as the drawings and description are only intended to illustrate a preferred embodiment thereof, and the right is therefrom expressly reserved to make such variations and changes as do not depart from the spirit and scope of the invention as hereinafter defined by the appended claims.

I claim as my invention:

1. In a device of the class described, a coupling head provided with a recess, a hook pivotally mounted in said recess and having a restricted shank, a slide member reciprocally mounted in said recess and provided with a slot adapted to receive said restricted shank, a latch member extending downwardly through said block and slidably mounted therein, and an operator mounted on top of said block and connected to said latch member.

2. A device as in claim 1, and a link having an eyelet to receive said hook for coupling the link and head, said link and head being movable relatively to each other to project the link into said recess to engage and retract the slide to swing the hook into engagement with the eyelet, and said latch member being released from a retracted position by the movement of said hook to be projected by gravity to lock the hook in an operative position.

3. In a device of the class described, a trailer hitch comprising a head adapted to be secured to a draft vehicle and provided with an outwardly diverging recess, a hook pivotally mounted in said recess, said hook being provided with a shank having a reduced free end forming a shoulder on its outer side, a latch member slidably mounted in said head, an operator connected to one end of said latch member for retracting it, the opposite end of said latch member, when in a retracted position, engaging the shank of said hook when in its uncoupled position, a block slidably mounted in the recess and having a cut-out portion to receive the reduced end of the shank, and a link adapted to be connected to a trailer, said link being movable relatively to said head to enter said recess to engage the block to thereby actuate said hook, the bill of said hook being swung thereby into engagement with said link to release the latch member, said latch member being projected by gravity to engage behind the shoulder to lock the hook in engagement with the link.

4. In a device of the class described, a coupling head adapted to be secured to a draft vehicle and provided with a recess having an outwardly diverging end and an enlarged portion, a hook pivotally mounted in said recess, a block slidably mounted in the enlarged portion of said recess and engaging the shank end of said hook, gravity actuated latch means slidably mounted in said head, a crank mounted on the top of said block and being connected to one end of said latch member for retracting it out of engagement with said hook, said hook being movable to a releasing position when said latch member is retracted to project the block toward the diverging end of said recess; and a link adapted to be connected to a trailer, said link being movable into engagement with the diverging end of said recess to engage and retract the block to project the bill of the hook into locking engagement with said link, and said latch member being released by the movement of said hook to be projected by gravity to retain the hook in engagement with the link.

ALBERT L. RANKIN.